Figure 1:
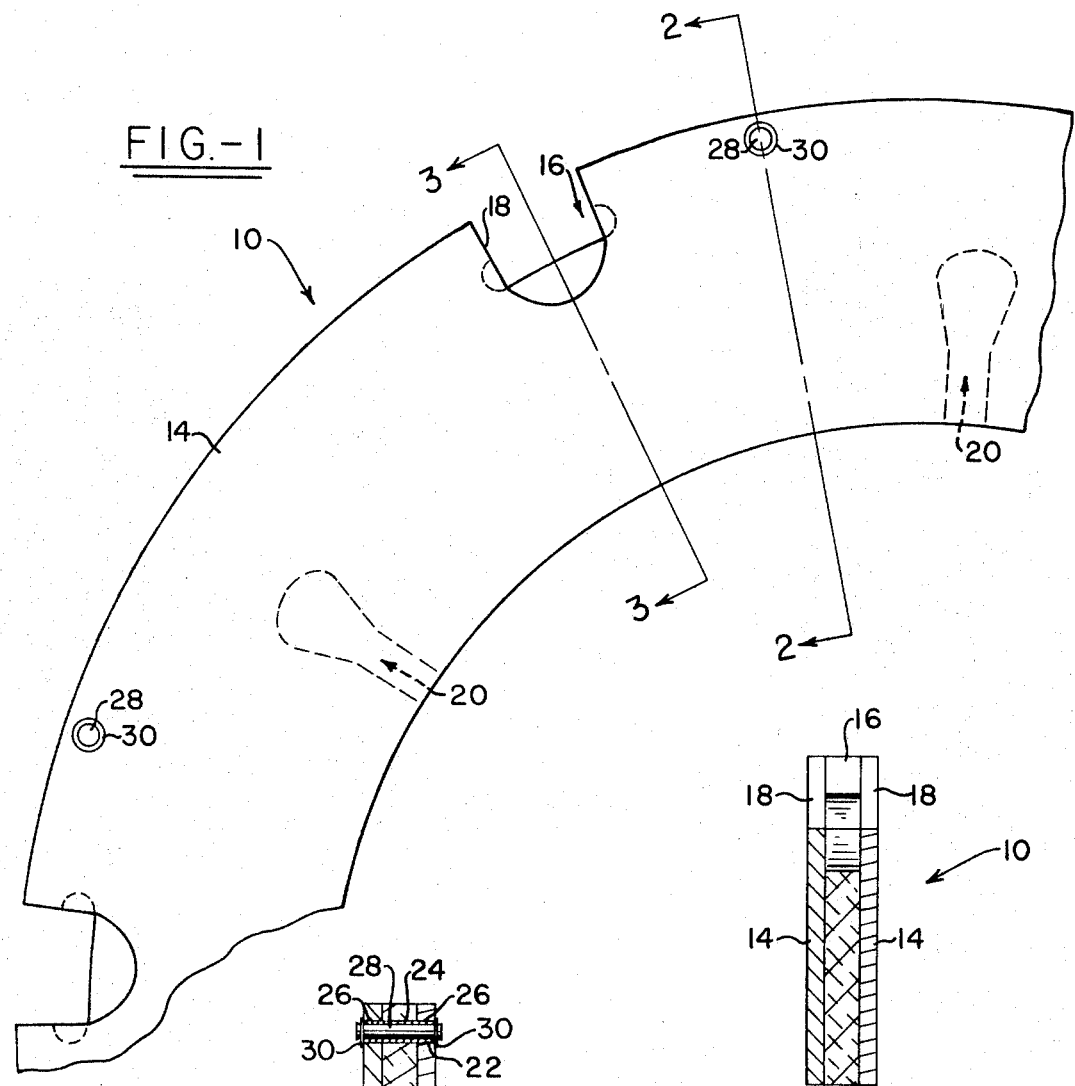

United States Patent [19]
Bermingham

[11] 3,724,613
[45] Apr. 3, 1973

[54] BRAKE DISC WITH BERYLLIUM CORE AND CARBON WEAR FACES

[75] Inventor: Peter D. Bermingham, Suffield, Ohio

[73] Assignee: The Goodyear Tire and Rubber Company, Akron, Ohio

[22] Filed: Oct. 16, 1970

[21] Appl. No.: 81,208

[52] U.S. Cl. ......188/218 XL, 188/251 M, 107/107 R
[51] Int. Cl................................................F16d 65/12
[58] Field of Search.188/73.2, 251 R, 251 A, 251 M, 188/218 XL; 192/107 M, 107 R, 107 C, 70.16, 70.19, 70.2

[56] References Cited
UNITED STATES PATENTS

| | | | |
|---|---|---|---|
| 3,552,533 | 1/1971 | Nitz | 188/251 A |
| 3,483,953 | 12/1969 | Bender | 188/218 XL |
| 3,405,784 | 10/1968 | Biabaud | 188/218 XL |
| 3,473,637 | 10/1969 | Rutt | 188/251 R |
| 3,613,851 | 8/1969 | Ely et al. | 188/218 XL |

*Primary Examiner*—George E. A. Halvosa
*Attorney*—F. W. Brunner, P. E. Milliken and Oldham & Oldham

[57] ABSTRACT

The rotating and stationary discs of a disc brake assembly are each formed of an annular beryllium core and annular carbon wear faces on the surfaces of the beryllium core. The wear faces are held to the core by rivets and bushings. The drive slots in the carbon wear faces are aligned with and match the drive slots of the beryllium core.

5 Claims, 3 Drawing Figures

PATENTED APR 3 1973　　3,724,613

INVENTOR.
PETER D. BERMINGHAM
BY
Oldham & Oldham
ATTORNEYS

BRAKE DISC WITH BERYLLIUM CORE AND CARBON WEAR FACES

The present invention relates to disc brake assemblies of the type having alternate stationary and rotating discs sandwiched between a backing plate and a pressure plate and more particularly to an improved disc assembly for such a brake unit.

Brake units of this type are sued in heavy duty braking installations, for example, as aircraft brake units. The units are subjected to high braking forces and considerable heat is generated during the braking operation. As a result, the brake discs must be of reliable structural integrity while possessing high heat sink characteristics. Also, the brake unit is preferably as lightweight as possible. The use of beryllium as a heat sink and structural material in such brake discs to achieve these desirable characteristics is taught by the prior art. However, the beryllium core brake discs of the prior art involve either complex encapsulated structures which are expensive and which do not achieve a maximum weight reduction or disc assemblies in which it is necessary to replace the entire assembly when the wear faces become worn beyond a usable amount. This is undesirable since it involves the discarding of the useable portions of the disc when only the wear surfaces need renewed.

It is the primary object of the present invention to provide a brake disc which is lightweight and which possesses high heat sink capability.

It is also an object of the invention to provide a brake disc assembly which may be refurbished in the field, reusing the core plates and replacing only the worn wear faces.

A further object of the invention is the provision of a brake disc assembly having a beryllium core plate to provide reliable structural integrity and high heat sink capability and carbon wear faces to provide uniform friction coefficient.

The above objects and others which will become apparent in the following detailed description are achieved by providing a brake disc which consists of a single piece annular beryllium core and single piece carbon wear faces on either side of the core. Rivets and bushings secure the wear faces to the beryllium core. The drive slots of the beryllium core and the carbon wear faces are aligned with one another and of matching width.

For a more complete understanding of the invention and the objects and advantages thereof reference should be had to the following detailed description and the accompanying drawing wherein there is shown a preferred embodiment of the invention.

Figure 2:
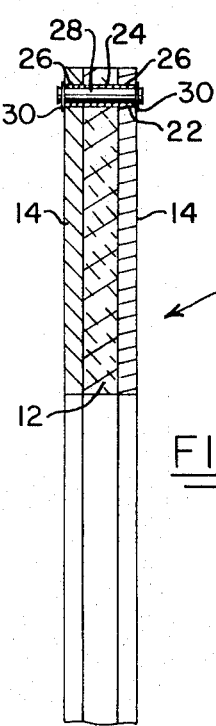
Figure 3:
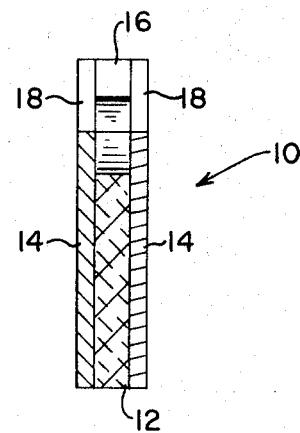

In the drawing:

FIG. 1 is a fragmentary side elevational view of a brake disc constructed in accordance with the principles of the invention, the disc shown being a rotating disc; and FIGS. 2 and 3 are fragmentary sectional views taken along the lines 2—3 and 3—3, respectively, of FIG. 1.

The brake disc designated generally by the numeral 10 has a single piece annular core 12 which is formed of beryllium to provide reliable structural integrity to the disc assembly as well as to reduce the overall weight of the assembly and to provide a high heat sink capability. Wear plates 14 which are each in the form of a single piece annular disc of a carbon base material, but may be segmented, are provided on the opposite faces of the beryllium core 12. Preferably the core 12 is about twice the thickness of each respective wear plate 14. The core plate 12 is provided at uniformly spaced locations on its outer periphery with drive slots 16 which engage keys or splines on the rotating wheel so that the disc rotates with the wheel while being capable of moving axially relative thereto. The wear plates 14 are provided on their outer periphery with notches 18 which are aligned with the drive notches 16 of the core. The notches 16 of the core and those 18 of the wear plates are of the same width, so that torque is transmitted through the core 12 and the plates 14 in proportionate amounts to their thickness. The beryllium core plate 12 may also be provided with notches or slots 20 extending radially outward from its inner circumference. These notches allow for expansion of the core plate 12 and prevent warping of the disc assembly 10. The carbon wear plates 14 and the beryllium core plates 12 are secured together by means of bushings 22 which pass through holes 26 of the wear plates 14 and a hole 24 of the disc 12 and rivets 28 which pass through the bushings 22. Washers 30 are provided to distribute the forces aserted by the rivets 28 over the faces of the wear plates 14. It will be noted that the actual working surface of the wear plates 14 is radially inward from the drive notches 16 and 18. The rivets 28 are located radially outward from the working surfaces of the plates 14.

When the wear plates 14 have become sufficiently worn, the disc assembly 10 is refurbished by removing the worn plates 14 and riveting new, unworn wear plates to the beryllium core 12. The use of carbon wear plates 14 also provides a uniform friction coefficient to the brake disc assembly. The composition of the plates 14 may vary across their thickness, or may be laminated, or the like. The carbon base may be carbon itself, particularly in the form of graphite or amorphous carbon, or carbon compounds typical of which are the carbides, such as boron carbide, silicone carbide, and titanium carbide. Mixtures of carbon in its various forms may of course be used. In addition to the carbon base other ingredients may be used such as anti-oxidants, binders, fillers, strengthening agents, and reinforcing fibers. The carbon base may be solid and of uniform consistency throughout, it may be a laminated relationship with some fiber mesh material, for example, or it may have certain sections such as adjacent torque carrying surfaces, for example, which vary in density make up or composition.

The characteristics of the material making up the plates 14 is critical to the operation of one disc against another in a disc brake stack and to the correct operation of the brake in combination. Specifically, the flexural strength of the material must be greater than 5,000 psi, the density greater than 1.45 grams per cubic centimeter, the specific heat greater than 0.17 cal/gm/° C. across the normal operating temperature range of the discs, conductivity greater than 0.04 calories per second per square centimeter per centimeter per degree centigrade, impact strength greater than 30 to 35 inch lbs. per inch in the parallel direction and 50 to 55 inch lbs. per inch in the perpendicular direction and the friction coefficient must be greater than 0.10 under normal operating conditions. We have found in order to achieve these characteristics that a combination of graphite and carbon to a minimum of about 75 percent of the total plate volume is required. The remaining volume of the plates 14 is made up by adding strengthening materials from a group composed of tungston metal, silicon carbide, and other high temperature additives. Further, it is desirable to add antioxidizing agents from a group consisting of boron, tungsten, silicon carbide, sirconium, titanium, etc.

As was pointed out above, the notches 18 of the carbon wear plates 14 are of the same width as the notches 16 of the beryllium core 12 and are aligned with these notches. This design permits a substantial portion of the torque encountered during braking to be transmitted through the wear plates 14, thus permitting a reduction in the overall thickness of the disc assembly without sacrificing the structural integrity thereof. Further, the laminated design of core 12 and plates 14 enables the brake disc assembly to be operatively held together simply by the rivets located outside the rubbed surface of the disc, on the inner or outer circumference, depending upon whether the disc is rotating or stationary. This results because some work is absorbed by friction between the adjacent surfaces as braking pressure is applied and the disc is compressed together. In other words some work takes place between the core 12 and plates 14 so that metal straps or some other type of notch reinforcement is not necessary. The bushings 22 and rivets 28 also serve to redistribute a portion of the torque load between the wear plates 14 and beryllium core 12 to achieve an efficient transfer of braking torque between the disc and the rotating wheel.

It will be understood that while a rotating disc assembly has been illustrated and described above, the construction of the disc may be equally adapted to a stationary disc assembly. In such an assembly the drive notches of the core and carbon wear faces would be provided along the inner periphery of the disc. Likewise, the rivets and bushings securing the carbon wear faces to the beryllium core would also be provided adjacent the inner circumference of the disc.

While, in accordance with the patent statutes, only the best known embodiment of the invention has been described and illustrated in detail the invention is not so limited. Reference should therefore be had to the appended claims in determining the true scope of the invention.

What is claimed is:

1. A brake disc for use in a brake unit comprising:
   an annular beryllium core plate having a plurality of drive means at uniformly spaced intervals on one circumference thereof;
   a wear plate formed of a carbon based material and of the same configuration as the core plate on each side of the core plate, the wear plates and the core plate having a plurality of aligned holes extending therethrough, the holes being perpendicular to the wear surfaces of the wear plates and located in non-rubbing portions of the wear plates adjacent the said one circumference;
   a bushing in each hole of the core plate, the bushings being substantially the same external diameter as the holes and of a length equal to the combined thicknesses of the wear plates and the core plate; and
   a rivet extending through each bushing, having enlarged end portions for holding the wear plates and core plate together, and forming the sole means securing the wear plates to the core plates.

2. A brake disc for use in a brake unit comprising:
   an annular torque carrying core plate formed of beryllium an having drive means at uniformly spaced intervals on one circumference thereof;
   a carbon base torque carrying wear plate of the same configuration as the core plate on each side of the core plate; and
   rivet and bushing means received in apertures in each plate to mechanically secure the wear plates directly to the core plates as a unit so that work can be absorbed as friction between the wear plates and the core when the disc is in a braking action, and said rivets positioned so as to not interfere with the rubbed surface of the wear plates, and wherein said core plate is about the same thickness as the combined thickness of said wear plates.

3. A brake disc for use in a brake assembly having alternate stationary and rotating discs carried between and axially movable between a backing plate and a pressure plate, comprising:
   an annular torque carrying core plate formed of beryllium and having drive notches at uniformly spaced intervals on one circumference thereof;
   annular torque carrying carbon base wear plates on either side of the core plate, the wear plates each having drive notches aligned with and of the same width as the drive notches of the core plate; and
   rivet and bushing means received in apertures in each plate to mechanically secure the wear plates directly to the core plate outside the rubbed surface of the wear plates.

4. The brake disc according to claim 3 wherein the core plate is of single piece construction.

5. The brake disc according to claim 3 wherein each of the wear plates is of single piece construction.

* * * * *